United States Patent [19]

Hatakeyama et al.

[11] Patent Number: 4,569,457
[45] Date of Patent: Feb. 11, 1986

[54] BOTTLE CLOSURE

[75] Inventors: Yoshiharu Hatakeyama; Shinichi Kozuka, both of Tokyo, Japan

[73] Assignee: Yoshida Industry Co., Ltd., Tokyo, Japan

[21] Appl. No.: 635,364

[22] Filed: Jul. 24, 1984

Related U.S. Application Data

[62] Division of Ser. No. 426,159, Sep. 28, 1982, Pat. No. 4,485,065.

[30] Foreign Application Priority Data

Mar. 30, 1982 [JP] Japan .................................. 57-49986
Apr. 8, 1982 [JP] Japan .............................. 57-49924[U]

[51] Int. Cl.[4] ............................................. B65D 39/00
[52] U.S. Cl. ................................................. 215/364
[58] Field of Search ....................... 215/364, 354, 341

[56] References Cited

U.S. PATENT DOCUMENTS

| 34,227 | 1/1862 | Ames | 215/364 |
| 3,599,820 | 8/1971 | Lee | 215/364 |
| 4,228,910 | 10/1980 | Barre | 215/364 |

FOREIGN PATENT DOCUMENTS

| 541495 | 10/1955 | Belgium | 215/364 |
| 1479255 | 3/1967 | France | 215/364 |
| 117403 | 7/1918 | United Kingdom | 215/354 |

Primary Examiner—Donald F. Norton
Attorney, Agent, or Firm—Wenderoth, Lind & Ponack

[57] ABSTRACT

A bottle closure includes a frusto-conical hollow sealing member open at its lower end and formed of a soft synthetic-resin material, and a closure cap having a T-shape and formed of a hard synthetic-resin material. The upper end of the sealing member is embedded in the closure cap, thereby integrally mounting the sealing member on the closure cap.

3 Claims, 7 Drawing Figures

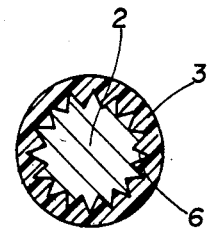
FIG. 2
PRIOR ART
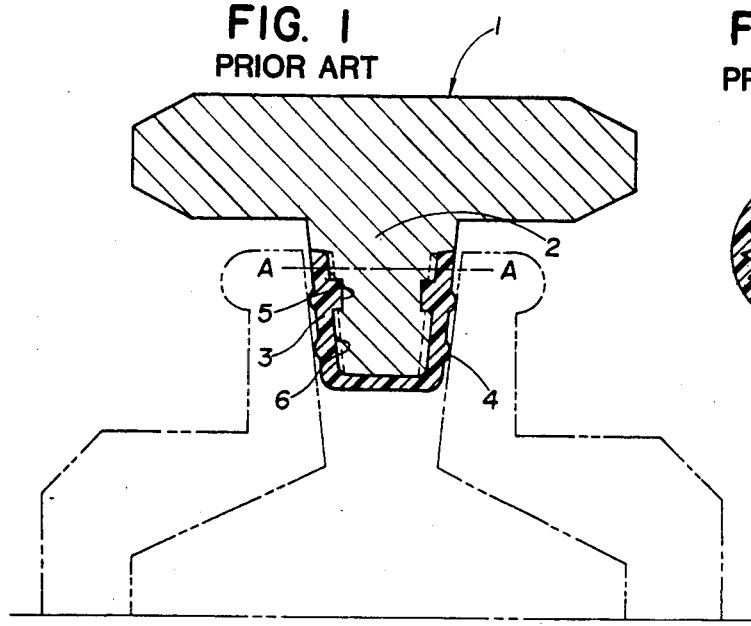
FIG. 1
PRIOR ART
FIG. 3
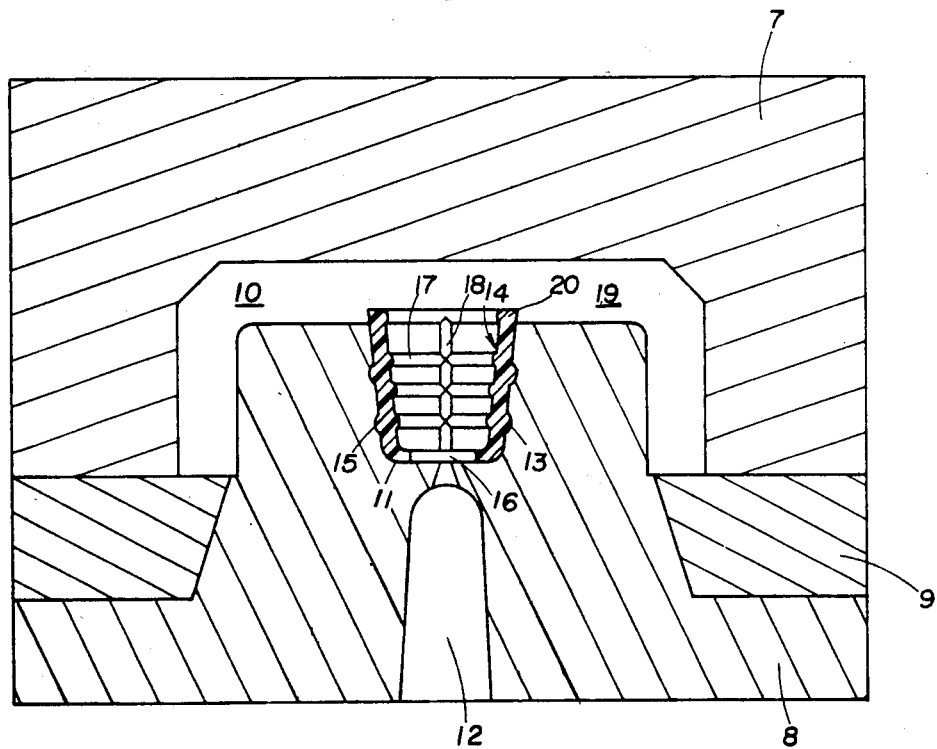

BOTTLE CLOSURE

This is a divisional application of Ser. No. 426,159, filed Sept. 28, 1982, now U.S. Pat. No. 4,485,065.

BACKGROUND OF THE INVENTION

The present invention relates to a bottle closure, and more particularly to a closure for a bottle which is intended to contain perfume.

Most perfume bottles are made of glass for the purpose of creating an impression that their contents are high-grade, or for some other purposes. It is believed, for the same reasons, that a screw closure which is commonly used in many other bottles does not match the perfume bottle and such bottle is generally closed by a closure having an inverted conical section which is fitted into a cone-like bottle mouth as shown in FIG. 1. In this connection, it is important that such closure can hermetically seal the bottle since the perfume is easily volatilized.

The conventional bottle closure shown in FIG. 1 which is also made of glass has a sealing member 3 on the outer surface of the conical section 2. The sealing member 3 is formed of a soft synthetic-resin such as polyethylene and is provided at its outer surface with circumferentially extended projections 4, in order that the bottle may be hermetically closed. The provision of the sealing member 3 is performed by an injection molding operation after the glass closure 1 is inserted in a die.

In order to prevent the sealing member from being detached from closure 1 or from relative movement circumferentially relative thereto, a recess 5 and saw-toothed surface 6 are provided in the conical section 2 for engagement with the sealing member 3, as shown in FIGS. 1 and 2. Such a countermeasure results in complexity of the grinding operations necessary to form the closure and in an increase in the manufacturing cost thereof. Furthermore, since the sealing member 3 is not of uniform thickness, sink marks or sunken areas are likely to develop on the surface during the molding of the member 3. Those sink marks serve unfavourably to decrease the sealing effect of the bottle.

Another type of bottle closure has been used recently in which a premolded sealing member of soft synthetic-resin material is fitted on a premolded closure cap formed of a hard synthetic-resin which is so selected that the cap will not spoil the external appearance of the entire bottle. Although such a closure may be manufactured with less difficulty than the above discussed glass made closure, the sealing member is likely to come off from the cap after an extended period of use due to the frictional resistance between the inside of the bottle mouth and the sealing member. This closure also is not free from the above discussed problem caused by sink marks. In addition, as the sealing member is to be fitted on the closure cap after the formation of these parts, any possible irregularity of the dimensions of the parts will cause an inferior fit therebetween and spoil the external appearance of the closure.

Accordingly, it is an object of the present invention to provide a bottle closure which can hermetically seal the bottle without spoiling the external appearance thereof.

Another object of the present invention is the provision of a bottle closure of the type set forth above in which a sealing member will never become detached from a closure cap and which is free from any dimensional irregularity.

SUMMARY OF THE INVENTION

The bottle closure according to the present invention includes a hollow sealing member, having an inverted frusto-conical shape with circumferentially extended projections on its outer surface and an open upper end and a lower end having therein an opening, of a soft thermoplastic synthetic-resin. The sealing member is disposed in a molding die defining a cavity of a substantially T-shape in elevational section, with an upper end of the sealing member projected into a horizontal portion of the cavity. Injected into the cavity through the opening in the lower end of the sealing member is a molten hard thermoplastic synthetic-resin which is then cooled to form a closure cap having embedded therein the upper end of the sealing member, thereby integrally mounting the sealing member with the closure cap.

Preferably, the sealing member is formed by an injection molding operation using a male die of the molding die which is at that time rotated and combined with a core to define a hollow space corresponding in shape to the sealing member. The molded sealing member is then disposed in the cavity by rotating the male die again to a position where it is combined with a female die and a stripper plate to close the molding die.

A bottle closure therefore comprises a closure cap made of a hard thermoplastic synthetic-resin and having a substantially T-shape in elevation, and an inverted frusto-conical sealing member formed of a soft thermoplastic synthetic-resin and provided at its outer surface with circumferentially extending projections. The sealing member is integrally mounted on the vertical section of the closure cap with an upper end of the sealing member being embedded in the horizontal section of the cap when the latter is molded.

Other objects and features of the present invention will become apparent from the following detailed description of preferred embodiments thereof when taken in conjunction with the accompanying drawings, in which:

BRIEF DESCRIPTION OF THE DRAWINGS

FIG. 1 is a sectioned elevational view showing a conventional bottle closure fitted into a bottle indicated by dotted lines, FIG. 2 is a cross sectional view taken along the line A—A in FIG. 1, FIGS. 3 to 5 are sectioned elevational views for explaining a method for forming a bottle closure according to a preferred embodiment of the present invention, each figure illustrating a different step of the method.

DETAILED DESCRIPTION OF THE INVENTION

Figure 4:
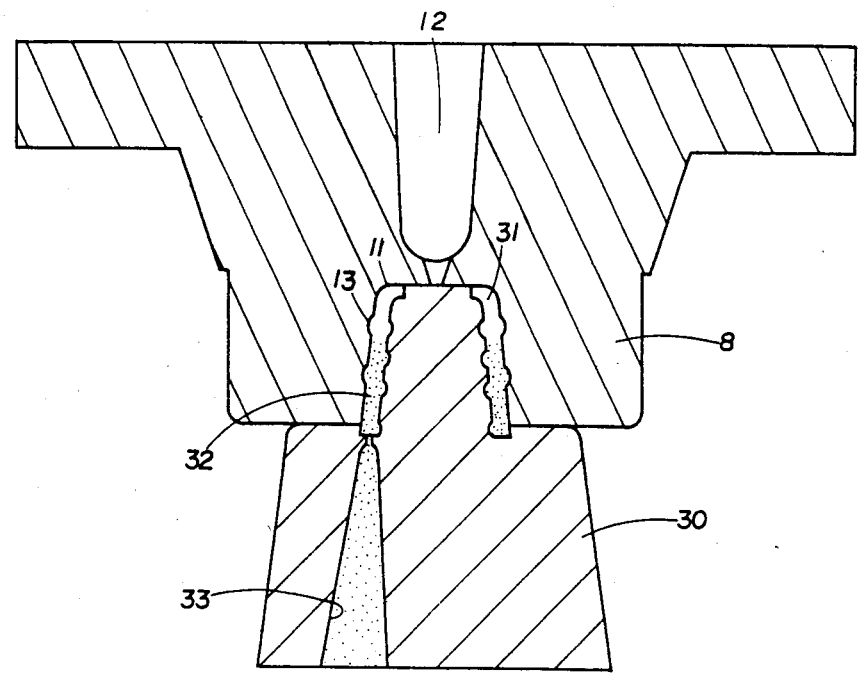

Referring to FIG. 3 of the drawings, there is shown a molding die for forming a bottle closure of the present invention. The molding die comprises a female die 7, a male die 8 and a stripper plate 9, together defining a cavity 10 of substantially T-shape in elevational cross section. An inverted frusto-conical recess 11 is formed at the center of the top portion of the male die 8 to constitute a vertical or base portion of the T-shaped cavity 10 and to communicate at the bottom thereof with a passage 12, through which a molten resin will be injected into the cavity as described hereinafter. Provided on the peripheral wall defining the recess 11 are a plurality of horizontal grooves 13 into which are loosely fitted circumferentially extending projections 15 formed on the outer surface of a hollow sealing member 14, thereby retaining the latter in the recess 11.

The sealing member 14 is made of a soft thermoplastic synthetic-resin and has an open upper end and an inverted frusto-conical shape corresponding to the recess 11 with an opening 16 at the lower end thereof. The sealing member 14 is preferably formed of polyethylene and may be provided at its inner surface with one or more transverse bars 17 and vertical bars 18.

Placement of the member 14 thus formed may be made by an insertion of the same into the recess 11 before closing the molding die. However, it would be more convenient to employ a so-called rotary-type molding machine which makes it possible to continuously carry out molding operations. If such molding machine is used, the male die 8 is first rotated to a position shown in FIG. 4, where it is combined with a core 30 to define a hollow space 31 corresponding in shape to the sealing member 14 to be formed. Then a molten resin 32 is injected into the hollow space 31 through a passage 33 in the core 30, thereby forming member 4. The male die 8 is again rotated to the position as shown in FIG. 3 with the sealing member 14 remaining in the recess 11 after the resin 32 is cooled and solidified.

Figure 5:
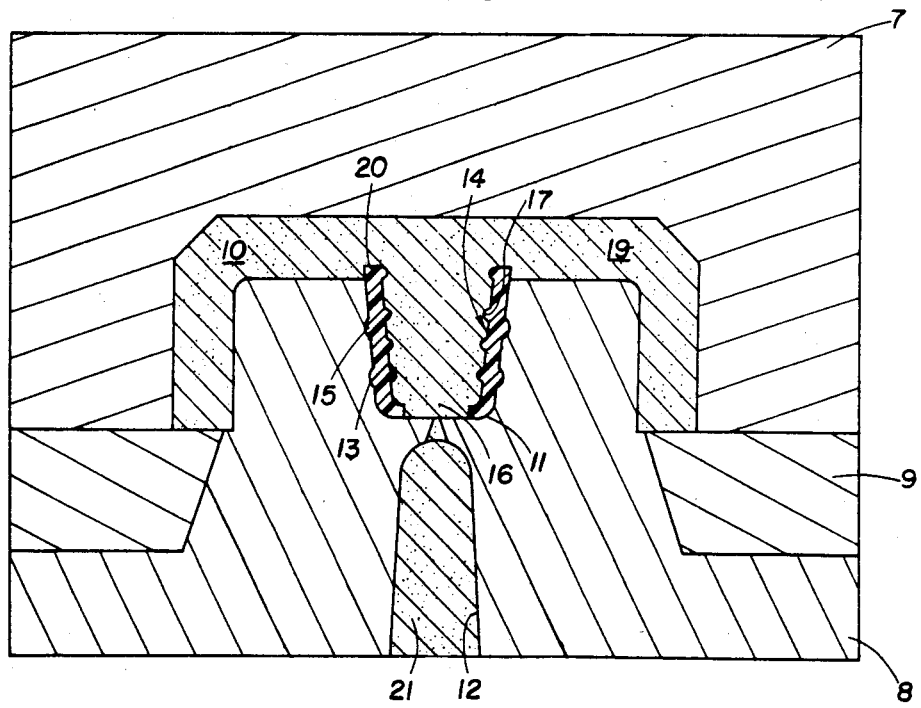

The T-shaped cavity 10 defined by the female die 7, male die 8 and the stripper plate 9 includes, in addition to the recess 11 forming the vertical portion of that, a horizontal or cross portion 19 which is extended downwardly at both ends thereof and into projects an upper or first end 20 of the sealing member 14. A molten synthetic-resin 21 is then injected into the cavity 10 through the passage 12 in the male die 8 and the opening 16 of the sealing member 14, as shown in FIG. 5. This resin 21 is a hard and thermoplastic resin, and polypropylene or methylpenten polymer, which are sufficiently corrosion resistant to the perfume, may be employed. It is also preferable that the resin 21 is melted at a temperature of 200° C. to 220° C. and injected into the cavity 10 under a pressure of 400 kg/cm$^2$ to 500 kg/cm$^2$, for the purpose as set forth below.

The resin 21 will fill the cavity 10. At this time, the sealing member 14 is pressed against the peripheral wall of the recess 11 of the cavity 10 by the heat and pressure of the molten resin 21, whereby the outer surface of the member 14 becomes completely even. After the cavity 10 is filled with the resin 21, the resin is cooled and solidified to form a closure cap 22. The molding die is then opened and the stripper plate 9 is moved upwardly to remove the molded product which will have contracted by that time.

Figure 6:
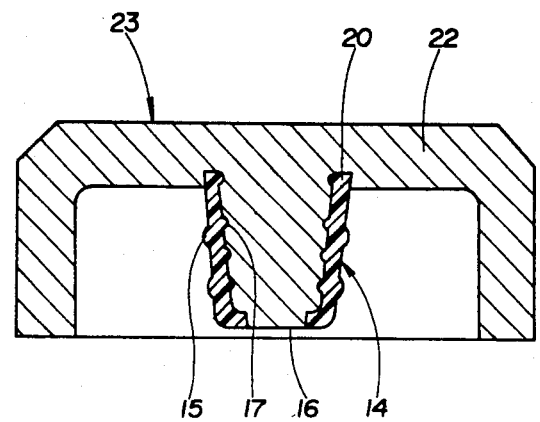
FIG. 6 is a vertically sectioned view showing a bottle closure according to an embodiment of the present invention.

FIG. 6 shows a bottle closure 23 formed according to the above method. In this closure 23, although the sealing member 14 of the soft resin has not been fused with the closure cap 22 of the hard resin, the sealing member 14 is integrally fixed to the closure cap 22 by the upper end 20 of the member 14 being embedded in the cap as well as by the transverse bars 17 and the vertical bars 18. Therefore, the sealing member 14 will never come off the closure cap 22, nor will member 14 move circumferentially relative to the cap 22, even if the closure 23 is inserted into or drawn from the bottle mouth with an exceptionally strong force or is turned in the mouth strongly. Furthermore, the outer surface of the sealing member 14, which is to be contacted with the inner wall of the bottle mouth, is free of any sink marks because the heat and pressure of the resin 21 has prevented the formation thereof when the closure cap was formed. Such outer surface of the soft member 14 is very effective in achieving a perfect closing of the bottle.

As described above, the sealing member 14 is integrally secured to the closure cap 22 at the time the latter is formed. Thus, it will be apparent that difficult operations required in the conventional method, i.e. fitting the sealing member on the closure cap or glinding the glass closure cap, no longer are necessary and that the present closure 23 is free from various defects caused by irregularity of dimensions. The closure cap 22 formed of the hard resin may present a good appearance similar to that of a glass closure.

Figure 7:
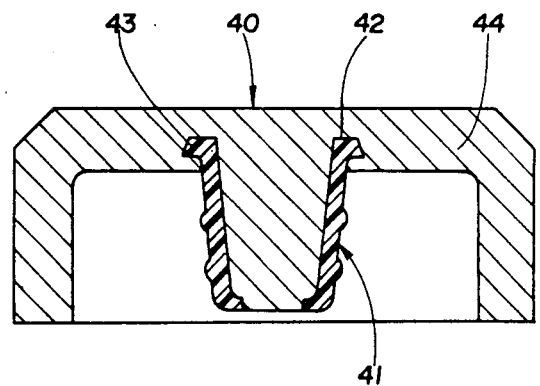
FIG. 7 is a sectional view of a bottle closure according to another embodiment of the present invention.

Reference is now made to FIG. 7 of the drawings, in which a bottle closure, according to another embodiment of the present invention is shown, In this closure 40, a sealing member 41 made of the soft synthetic-resin has an outer flange 43 at an upper end 42 thereof which is embedded in a closure cap 44 of the hard resin. This flange 43 can effectively prevent the sealing member 41 from being detached from the cap 44 and serves to securely transmit the rotation of the cap 44 to the member 41 without any relative circumferential movement therebetween. Thus, the transverse and vertical bars provided in the first embodiment are omitted.

The closure 40 of the second embodiment can be formed by substantially the same method as described above. Also, other structures and features of this closure 40 are substantially the same as those of the first embodiment.

The present invention may be applied to closures for various kinds of bottles which are intended to contain volatile matter, and many modifications and alterations may be made within the spirit of the present invention.

What is claimed is:

1. A bottle closure comprising:
   a closure cap formed of a hard thermoplastic synthetic resin material, said closure cap having a substantially T-shape in elevational cross section including vertical and horizontal sections;
   an inverted frusto-conical sealing member formed of a soft thermoplastic synthetic resin material and provided at the outer surface thereof with circumferentially extended projections; and
   said sealing member being integrally mounted on said vertical section of said closure cap, with an upper end of said sealing member being embedded in said horizontal section of said closure cap by injection molding of said closure cap over said upper end of said sealing member.

2. A bottle closure as claimed in claim 1, wherein said sealing member has at the inner surface thereof a plurality of transverse bars and vertical bars, said transverse and vertical bars being tightly fitted in grooves formed on said vertical section of said closure cap.

3. A bottle closure as claimed in claim 1, wherein said sealing member has at said upper end thereof a radially outwardly extending flange embedded in said horizontal section of said closure cap.

* * * * *